United States Patent [19]

Moir

[11] Patent Number: 4,988,441
[45] Date of Patent: Jan. 29, 1991

[54] CLARIFICATION APPARATUS

[76] Inventor: John Moir, 24 Hazel Close, Highcliffe, Christchurch, Dorset, England

[21] Appl. No.: 391,133

[22] Filed: Aug. 8, 1989

[30] Foreign Application Priority Data

Aug. 9, 1988 [GB] United Kingdom ............... 8818866

[51] Int. Cl.$^5$ ............................................. B01D 21/02
[52] U.S. Cl. .................................. 210/522; 210/802
[58] Field of Search ............... 210/521, 522, 802, 541, 210/532.1

[56] References Cited

U.S. PATENT DOCUMENTS

| 2,314,977 | 3/1943 | Green | 210/522 |
| 2,570,304 | 10/1951 | Bach | 210/802 |
| 2,793,186 | 5/1957 | Dunell et al. | 210/521 |
| 3,306,456 | 2/1967 | Fromson et al. | 210/256 |
| 3,718,257 | 2/1973 | Bach | 210/802 |

FOREIGN PATENT DOCUMENTS 240827 6/1965 Austria .
5340 of 1891 United Kingdom .

Primary Examiner—W. Gary Jones
Assistant Examiner—Christopher Upton

[57] ABSTRACT

Liquor-clarifying apparatus comprises a tank 1, inlets 2 for suspension to be clarified, outlet 3 for clarified water, outlet 4 for sedimented solids, and a plurality of settling assemblies each comprising a stack 6 of downwardly inclined plates 7 mounted around a vertical collection duct 39. This duct generally comprises a downwardly extending duct 18 that leads directly into an upwardly extending duct 27. The plates 6 are preferably conical or pyramidal and are preferably self-spacing and capable of being clipped together by a push fit. A downwardly extending skirt 40 may be provided. Orifices 25 allow clarified liquid to pass from between the plates into the collection duct and preferably these orifices are elongated.

24 Claims, 5 Drawing Sheets

CLARIFICATION APPARATUS

The present invention relates to clarification apparatus for increasing the rate of gravitational separation of particulate solids from an aqueous or other liquid suspension.

Such clarification apparatus is used in a range of industrial applications where large volumes of water must be clarified for either disposal or recirculation. When only limited space is available it is very desirable for the apparatus to be compact.

In many industrial processes, sedimentation occurs in large tanks, with the clarified liquor being taken from the top and the sediment from the bottom Such tanks occupy a large horizontal surface area and it is well known to reduce the required horizontal surface area of the tanks, per unit throughput, by dividing the tank into a plurality of sedimentation cells, each cell being defined by a pair of inclined, substantially parallel, adjacent settling plates. The solids flow down the upper surface of the lower plate in each pair. Generally a plurality of the plates are arranged vertically as a stack, and each stack of plates and its associated collection apparatus can be regarded as an assembly within the overall apparatus.

In some systems the clarified liquor flows along the lower surface of the uppermost plate and into a collection duct at the end of the plates, e.g., as in GB No. 2,150,039. In GB No. 2,170,419 the suspension is fed into the center of a series of open cones and both the clarified liquor and the sediment move downwardly cocurrently between adjacent pair of cones and it is proposed that both the sediment and the clarified liquor can flow downwardly to the bottom of a vessel from which the clarified liquor is then taken upwardly through a riser pipe while the sediment is removed from the base of the tank. Unfortunately there is a very high risk of separated solids being resuspended into the clarified liquor.

In order to minimise this risk it is well known to arrange for the solids and the clarified liquor to move counter-current in each cell with the solids sedimenting from the lower part of each adjacent pair of plates and the clarified liquor rising to the upper part of each pair, and being taken off from this upper part.

In general terms, liquor-clarifying apparatus of this general type comprises a tank having at least one inlet for suspension to be clarified, at least one first outlet for the clarified liquor, at least one second outlet for separated solids, a plurality of settling assemblies, and collector means for collecting clarified liquor within the settling assemblies and for leading it to the first outlet or outlets, and in this apparatus each settling assembly comprises a stack of inclined substantially parallel settling plates positioned in use to discharge the separated solids from the lower part of each plate downwardly towards the second outlet or outlets, a substantially vertical collection duct which is part of the collector means and which extends up through the stack, and orifices opening into the duct from the cells defined by each pair of adjacent plates for passage of clarified water from each cell into the duct.

Such apparatus is referred to below as "apparatus of the kind described".

Although the principle is very well known, and although many alternative constructions have been described in the literature, in practice they have proved useful only for a very limited number of commercial applications. One problem is that it is necessary to provide a large number of the parallel plates, if the apparatus is to have a large throughput, and this has led to very complex piping and engineering difficulties which has rendered the systems relatively uneconomic where space is very limited. Another, and potentially fatal, problem has been the tendency for blockages to occur, especially in the collectors for removing the clarified water.

The collector often comprises an upflow pipe into which the orifices lead. Systems of this type are described in, for instance, U.S. Pat. Nos. 2,314,977 and 3,718,257 and in FIG. 5 of GB No. 635,591. Because the rate of flow at the bottom of the upflow pipe is derived solely from liquid entering from the cell defined by the lowermost pair of plates, whilst the rate of flow at the top of the upflow pipe is derived from the entire stack of parallel plates, it is inevitable that the rate of flow at the top is very much greater than the rate of flow at the bottom. The clarified liquor often carries a small amount of suspended solids into the upflow pipe and the low flow rate at the base of the pipe results in these solids tending to form a sediment in the pipe, causing a blockage at the bottom of the pipe and, effectively, putting the lower pairs of plates out of action.

This difficulty is accentuated by the fact that the suspension tends to have a higher solids content at the bottom of the tank than at the top. It is therefore desirable to ensure that the take-off of clarified liquid from between each lower pair of plates is less than the take-off from between each higher pair of plates where the solids content is less. This may be achieved by providing smaller orifices from the lower pairs of plates than from the higher pairs of plates. The reduced flow of clarified liquor through these smaller orifices accentuates still further the risk of sedimentation in the collection pipe.

Probably for this reason U.S. Pat. No. 2,314,977 and GB No. 635,591 propose the provision of a drain from the bottom of the collection pipe and U.S. Pat. No. 3,718,257 proposes the provision of separate stacks of plates at the lowermost part of the apparatus. However these proposals are not really practicable when there are a large number of stacks of plates in a single apparatus.

It is also known to collect downflow. Thus in FIG. 1 of GB No. 635,591 the apparatus consists of a single stack of plates with a downflow collector leading to a horizontal pipe which in turn leads to a downward drain and a riser pipe from which the clarified liquor is removed. Sedimentation is liable to occur in the horizontal pipe, which is probably why the drain has to be provided. In GB No. 1,064,918 there is a plurality of stacks each having a downflow collector pipe and these pipes all lead down into a lower, closed, collection chamber from which the clarified liquor can be removed. Sedimentation is liable to occur in this chamber and because this is situated underneath a large number of stacks it would be extremely difficult in practice to remove the sediment.

In the patents mentioned above the parallel plates are generally conical but pyramids are also mentioned.

Another type of collector is described in, for instance, U.S. Pat. Nos. 3,951,818 and 4,747,196. In this the plates are elongated chevrons having horizontal collectors that then lead into upflow collectors. There is a risk of sedimentation in the upflow collectors, as discussed above, and there is also a risk of sedimentation in the horizontal collectors.

The construction of most of the apparatus mentioned above is extremely complex and does not lend itself to convenient manufacture and easy access to all the component parts. GB No. 1,064,918 mentions that the cones in that can be self-spacing but the cones in that are of very complex shape and are arranged to discharge the sludge through small ports instead of discharging off the bottom edge of the cones U.S. Pat. No. 4,747,196 describes a system of clipping together the horizontal and upflow collectors and of resting the elongated chevron plates on the horizontals. Neither of these proposals provides a convenient way of constructing and assembling conical or pyramidal collectors of simple shape.

It would therefore be desirable to provide a clarification apparatus that is less liable to blockage by sedimentation, especially in the collector means for carrying the clarified liquid away from the stacks, and to provide apparatus that can be of very simple construction and yet can have a very large number of collector plates, arranged in a plurality of stacks. It would also be desirable to provide such apparatus that provides improved clarification at a given rate of throughput, or improved throughput at a given rate of clarification, than is obtainable using present apparatus of similar volume. In particular it would be desirable to provide such apparatus in which the settling assemblies can easily be installed in a tank that is already provided with the necessary inlets and outlets, since this facilitates the provision of the apparatus in confined spaces, such as underground.

The invention provides novel liquor clarifying apparatus of the type described comprising novel settling assemblies. Accordingly the invention includes both settling assemblies for use in the overall apparatus and the overall apparatus. It also includes the individual settling plates that can be assembled to provide the settling assemblies.

In a first aspect of the invention, the substantially vertical collection duct of apparatus of the kind described comprises a downwardly extending duct into which open the orifices from at least the lowermost pairs of plates in a stack, and an upwardly extending duct into which the downwardly extending duct leads directly. Thus clarified liquor from at least the lowermost cells flows downwardly through the downwardly extending duct and is then led directly into the upwardly extending duct and it flows upwardly through this either direct to a first outlet or to another part of the collecting means for transmission to a first outlet.

The suspension that is to be clarified enters the tank via the inlet or inlets, which is or are usually at or near the top of the tank. The amount of gravitational settlement of the particulate solids material towards the second outlet is increased by the large settlement area provided by the plurality of settling plates.

Each pair of adjacent plates defines an inclined clarification cell and particles settle out on the upper surface of the lower plate and are discharged downwards from the lowermost part of that cell. The angle of the plates (and therefore of each cell) to the horizontal is usually in the range 35° to 75°, often 50° to 70° preferably about 60°.

The suspension that is to be clarified enters from the tank into each cell at the lowermost part of the cell and thus flows countercurrent to the solids that are discharging downwardly from that part. There may be some degree of entrainment of the solids that are discharging from the upper cells as they pass across the lowermost parts of the lower cells, by suspension that is flowing into the lower cells. However this is generally acceptable. In order to minimise the entrainment of solids by the suspension as they discharge from the lower parts of the cells down towards the second outlet it is preferred that the stacks should be arranged in such a way as to allow free fall of solids from the outer edges of each stack down to the second outlet for the separated solids. This second outlet is generally in the base of the tank. Typically therefore there must be an adequate free space between each adjacent stack to allow substantially free fall of solids and in practice this generally necessitates that there should be a free space of at least 2 cm, and usually 4 to 10 cm, between the closest portions of each stack.

These dimensions are appropriate when the inclined distance between the upper and lower parts of each cell is, as is usually preferred, not more than about 25 cm, typically 5 to 20 cm and when the vertical spacing between the plates is typically 0.5 to 10 cm, often around 5 cm, since these dimensions will then provide a sufficient quiescent zone for the removal of the volumes of solids that are likely to discharge from each cell. However if the dimensions of the cell are considerably greater, and in particular if the inclined distance between the upper and lower parts is much greater, it may be necessary to provide a larger free space between each adjacent stack.

Each pair of inclined settling plates preferably defines a downwardly inclined, substantially parallel-sided, cell having a horizontal open slot defined by the lowermost edges of the plates. Despite the general desirability of avoiding intermixing of the discharging solids with inflowing suspension that is to be clarified, it is desirable to arrange the plates so as to cause the suspension to enter each cell at its lowest possible level upwardly through the blanket of solids settling within the cell. This promotes upflow clarification and entrapment of particles and of microflow of particles in a manner similar to a conventional sludge blanket effect Preferably therefore each plate has a skirt that extends downwardly from its lowermost edge so as to define with the lowermost edge of the lower plate a horizontal open slot situated at substantially the lowest possible level of the cell. For instance if the vertical spacing between the inclined plates is Xmm, the vertical dimension of the slot that is defined between the bottom of the skirt on the upper plate and the lowermost edge of the lower plate is preferably less than ¾ of X and is most preferably around ¼ to ⅔ X, generally around ½ X. The positioning of this slot means that the suspension that is to be clarified tends to be forced to flow into each cell at the lowest possible level and hence to rise upwardly through the solids already contained in the cell to result in improved clarification and separation of solids.

This provision of the skirt around the lowermost edge of the plate is of value in any apparatus of the kind described, irrespective of whether collection is downflow or upflow, and so constitutes another aspect of the invention. It is of particular value when the collection is downflow as described above. The plates, and assemblies of the plates, are novel.

In all aspects of the invention each stack is generally arranged substantially vertically and parallel to each adjacent stack. The tank can contain as few as, for instance, 4 stacks but preferably it contains at least 10, and often at least 40, stacks Each stack generally extends from at or near the top of the tank downwards to the lower half of the tank. Often it terminates sufficiently above the second outlet to minimise accumulation of settled solids around the stack. For instance it normally extends through 50 to 90% of the distance from the top of the tank to the second outlet. Each stack often includes above 50, and often above 100, of the parallel plates The plates may be horizontally elongated plates that define wide inclined cells or, preferably, that define long, chevron-shaped cells, e.g., as in U.S. Pat. Nos. 3,951,818 or 4,747,196. Preferably they are cone shaped or, most preferably, pyramid shaped These are preferred since they permit a central collector means for each stack and also permit a high plate area in a tank without causing turbulence between stacks.

Each cell must be provided with one or more orifices for removing clarified water from the space contained between each pair of adjacent plates, i.e., the upper part of each separation cell. Thus each cell is not open to the tank at its upper part but the orifices that lead into the substantially vertical collection duct provide the only route for the clarified water out from the upper part of the cell.

When the plates are inclined, horizontally elongated plates joined at their tops to form chevron-shaped cells, then the collector means generally includes both the vertical collection duct and a horizontal elongated collection pipe or other duct positioned under the apex of each chevron cell and provided with orifices for receiving clarified liquid that rises up through each part of the chevron, and each of these horizontal collector pipes leads into the substantially vertical collection duct that comprises or consists of the downwardly and/or upwardly extending ducts.

However there is a risk that these horizontal collector pipes may suffer blockage It is therefore preferred for the orifices to enter direct into a substantially vertical collection duct that comprises or consists of the downwardly and/or upwardly extending ducts. If the plates are horizontally elongated plates then the vertical collection duct will also be horizontally elongated and substantially co-extensive with the plates. The plates may be arranged on just one side of this elongated substantially vertical duct but preferably the plates are arranged on both sides of the collection duct since it is preferred that the collection duct should be positioned at the center of each stack.

This is particularly advantageously achieved when the plates are conical or pyramidal since the substantially vertical collection duct can then be a central column surrounded by the plates and provided with orifices through its walls to allow the entry into the duct of clarified liquid from each pyramidal or cone-shaped cell. Provided the substantially vertical collection ducts and stacks are sufficiently upright for effective upflow, the exact angle of them is not critical. However it is convenient, for constructional reasons, for each to be as close to the true vertical as is conveniently possible.

Since the flow of liquid in the downwardly extending collection duct is downwards, the flow velocity will be higher at lower parts of the duct than at higher parts, since the lower parts will be carrying the clarified liquid from a greater number of cells, and thus the tendency for sedimentation in the duct is avoided. However this advantage would be lost if, as in the prior art downflow collectors, the collected clarified liquor was allowed to move into an area of slack flow at the base of the duct. Accordingly it is important in the invention that the downwardly extending duct leads directly Into an upwardly extending outlet duct, in the sense that the fluid path between the downflow and upflow ducts is sufficiently short that slack flow of a type that is liable to lead to sedimentation in that path cannot occur. This is in contrast to, for instance, the chamber of GB No. 1,064,918 and the horizontal connection of GB No. 635,591, this horizontal connection inevitably having a considerable length if that apparatus was modified to have a plurality of stacks within a tank.

Although it is usually sufficient for each of the downwardly and upwardly extending ducts to be of similar and uniform cross section area along their lengths if desired either or both can be made of variable cross section area. For instance the downwardly extending duct could be tapered or otherwise constricted at the lower end in order to accelerate the linear rate of flow at the lower end to reduce the risk of sedimentation or could be constricted at its upper end so as to control the amount of flow throughout its length.

The upwardly extending outlet duct can be spaced apart from the downwardly extending collection duct (provided the connection between them does not permit slack flow, as discussed above), but preferably the ducts are substantially directly adjacent to one another. Preferably there is a common wall separating them and, in particular, it is preferred for the upwardly extending duct to be inside, and most preferably co-axial with, the downwardly extending duct. Thus the clarified liquid flows down the annular or other downwardly extending duct and at the bottom of the duct it reverses its flow and flows substantially immediately upwardly through the central or other upwardly extending duct.

The downwardly extending duct must collect the clarified liquid at least at the lowermost part of the stack, since this is where blockage in the collection duct is most liable to occur. For instance it usually collects from at least the bottom 10%, and often at least the bottom 25% of the depth of the stack. Frequently it collects from the entire stack in which event the upwardly extending duct does not also collect clarified liquid. If the downwardly extending duct collects from part only, e.g., not more than 50%, of the depth of the stack, the upwardly extending duct above the downward duct will serve as collector from the upper parts of the stack and so will have the orifices (or the horizontal collectors) leading into it from cells at positions above the downward duct.

Thus preferred apparatus has a composite substantially vertical collection duct comprising a downwardly extending collection duct that opens at its base into an inner, substantially coaxial, upwardly extending duct and in which the orifices (or the horizontal collection pipes if the orifices are in these pipes) extend through the outer wall of the downwardly extending duct and, if this duct does not extend through the entire length of the stack, through the outer wall of the upwardly extending duct above the downwardly extending duct.

The composite duct can be of uniform diameter and so it is possible to control the downwards or upwards flow rates by appropriate choice of the diameter of the inner duct. Two or more downwardly extending ducts may be positioned one above the other in the composite duct and may have differing internal diameters.

Some or all of the upwardly extending outlet ducts in a tank may lead through other suitable components of the collector means such as a horizontal duct into which the upwardly extending ducts open, to a single outlet from the tank It is usually preferred for the open, upper outlet end of each upwardly extending duct to serve as one of the first outlets and there are as many first outlets as there are upwardly extending ducts Thus preferably the collector means consists of the vertical ducts. It is particularly convenient for each of the upwardly extending ducts to lead directly into a launder above the tank. This eliminates the need for horizontal pipe connections typical of much of the prior art and, instead, permits a very simple system for collecting the clarified liquor If any sedimentation occurs within this collection launder, removal of the sediment can be achieved easily since the launder is situated above the tank and so is readily accessible.

The orifices for removing clarified liquid from each cell may be conventional and thus they may be spaced apart circular orifices which may all be of the same diameter and may provide the same orifice area at each position in the stack, or the orifice area may vary along the height of the stack. For instance the orifices may be smallest near the base of the stack so that the orifice area is lowest near the base of the stack.

A problem with conventional orifices is that each orifice has a small cross section area relative to the cross section area of the adjacent part of the cell from which the orifice is collecting clarified liquid. For instance even if several orifices are distributed around the collection duct the total cross section area of the orifices is generally less than one third, and often less than one tenth, of the cross section area of the cell at that point, i.e., of the periphery of the duct. Accordingly the clarified liquor has to flow from the much wider collection area of the cell into this very narrow orifice area, and this both promotes turbulence and resuspension of settled solids close to the orifice and their redeposition in the collector duct into which each orifice opens.

These disadvantages can be eliminated if the orifices have a greater horizontal length than usual.

According to another aspect of the invention the orifices in apparatus of the kind described have a horizontal orifice length at least half, generally at least two thirds and preferably at least three quarters of the horizontal length of the plates at the position of the orifices The remainder of the apparatus can be as described above in connection with the other aspects of the invention. The collector means can extend downwardly and out from the bottom of the tank or they can extend upwardly and out from the top of the tank, but preferably the collector means extend downwardly and lead directly into an upwardly extending outlet duct, as described above.

By referring to the horizontal orifice length is meant the horizontal length of the opening or openings through which the clarified liquid can pass. Conveniently the orifices comprise one or more substantially horizontal slots but, if desired, they can comprise a closely adjacent row of other orifices, for instance substantially circular orifices. This aspect of the invention is valuable when the orifice means extend into horizontal collection pipes, e.g., as in U.S. Pat. No. 3,951,818, since it greatly reduces the risk of blockage in the horizontal pipes. However it is of particular value when the plates are cone shaped or, especially, pyramid shaped since it is then possible to provide a slot (or a row of orifices) having a length that is a significant amount of the total horizontal length of each open portion of the pyramid This achieves particularly linear, non-turbulent flow towards the orifice avoids redeposition in and blockage of the collector means.

The substantially vertical collection duct can be a preformed pipe or other duct on to which the plates are fitted, e.g., as a tight sliding fit.

According to another aspect of the invention each settling plate in a pair comprises a neck portion and an inclined portion and spacer means are provided either on the neck portion of at least one plate in a pair or for fitting separately between the pair of plates for self-spacing of the plates. Each stack can be assembled on a central collection duct by alternating plates and spacers that fit between the neck portions of adjacent plates, or by sliding over the duct plates that have spacers integral with their neck portions. Thus each plate may have an integral spacer extending upwardly (or downwardly) or some of the plates may have such spacers extending upwardly and downwardly while the other plates have no spacers integral with the neck. These spacers take the form of substantially vertical necks on the uppermost edges of the plates The assembly may therefore be formed merely by sliding the plates, and if necessary the spacers, over the central duct. The plates themselves are novel.

It is particularly convenient for the substantially vertical collection duct to be defined by the integral vertical necks on the upper edges of the plates since it is then unnecessary to provide a preformed duct. Preferably the vertical necks are provided with push inter-engaging fit means for securing the plates one above the other by push inter-engagement of the fit means, i.e., merely by pushing them together.

The orifices may be provided through or between the necks and may be conventional orifices or may be elongated orifices as described above. In this aspect of the invention the apparatus may be as described above but the duct may be a downflow collection duct or an upflow collection duct. However it is particularly preferred for the duct to be the outer wall of the described composite duct comprising the downwardly extending collection duct that leads directly into an upwardly extending outlet duct, and an inner duct can be inserted coaxially to define the wall between the downward and upward ducts.

It is often preferred for the inter-engaged cones or pyramids to be maintained under vertical compression so as to minimise the risk of them separating from one another. When the upward duct extends through the length of the stack convenient means for providing this vertical compression comprises the upwardly extending duct being provided with means for exerting vertical compression on the stack. Suitable means is a nut threaded externally on to the lower or upper end of the duct.

The apparatus of the invention can be made of any corrosion resistant material, for instance corrosion resistant metal or, preferably, plastics material When the stack is merely fitted together by push inter-engagement it is particularly preferred that the plastics material should have a density less than the density of the fluid (and therefore generally below 1) so as to provide vertical compresion on the stack and to eliminate any tendency for the plates to sink.

Cone or pyramid shaped plates in the invention generally have a linear dimension up the inclined part of 5–30, often 10–20, cm. Preferred width dimensions at the lowermost edge of the pyramid is about 15 cm. They can be vertically spaced, e.g., about 1 cm apart but the spacing is preferably greater, e.g., 2 to 10 cm, often about 5 cm. The vertical dimension of the slot around the lowermost edge of a plate (or its skirt) is usually at least 1 cm, often 2–5 cm.

The invention is useful for the separation of the liquid and solid phases of a wide variety of suspensions. The liquid is usually water and the solid may be an inorganic particulate material, for instance coal, or crushed mineral ore or fines, or a pigment. Alternatively, the solid can be organic, for instance sewage particles or a coagulum formed from humic substances. The solids content of the suspension typically is in the range 0.01% to 5%. The particles are preferably flocculated, for instance by the addition of a conventional flocculating agent before entry to the apparatus, so as to promote their separation from the water.

The various aspects of the invention provide separating apparatus that can give good solids separation and clarification at a high throughput of suspension even though the space occupied by the apparatus can be very low, and in particular the invention provides apparatus that is very easy to construct and maintain and to keep clear of blockages. It is possible to increase the amount of suspension that can be clarified to any particular clarity by a factor of at least 5, and often 10 to 12 or more, relative to the amount that can be clarified in a tank of the same volume and base area but in the absence of the stacks.

The invention is illustrated in the accompanying drawings in which.

Figure 1:
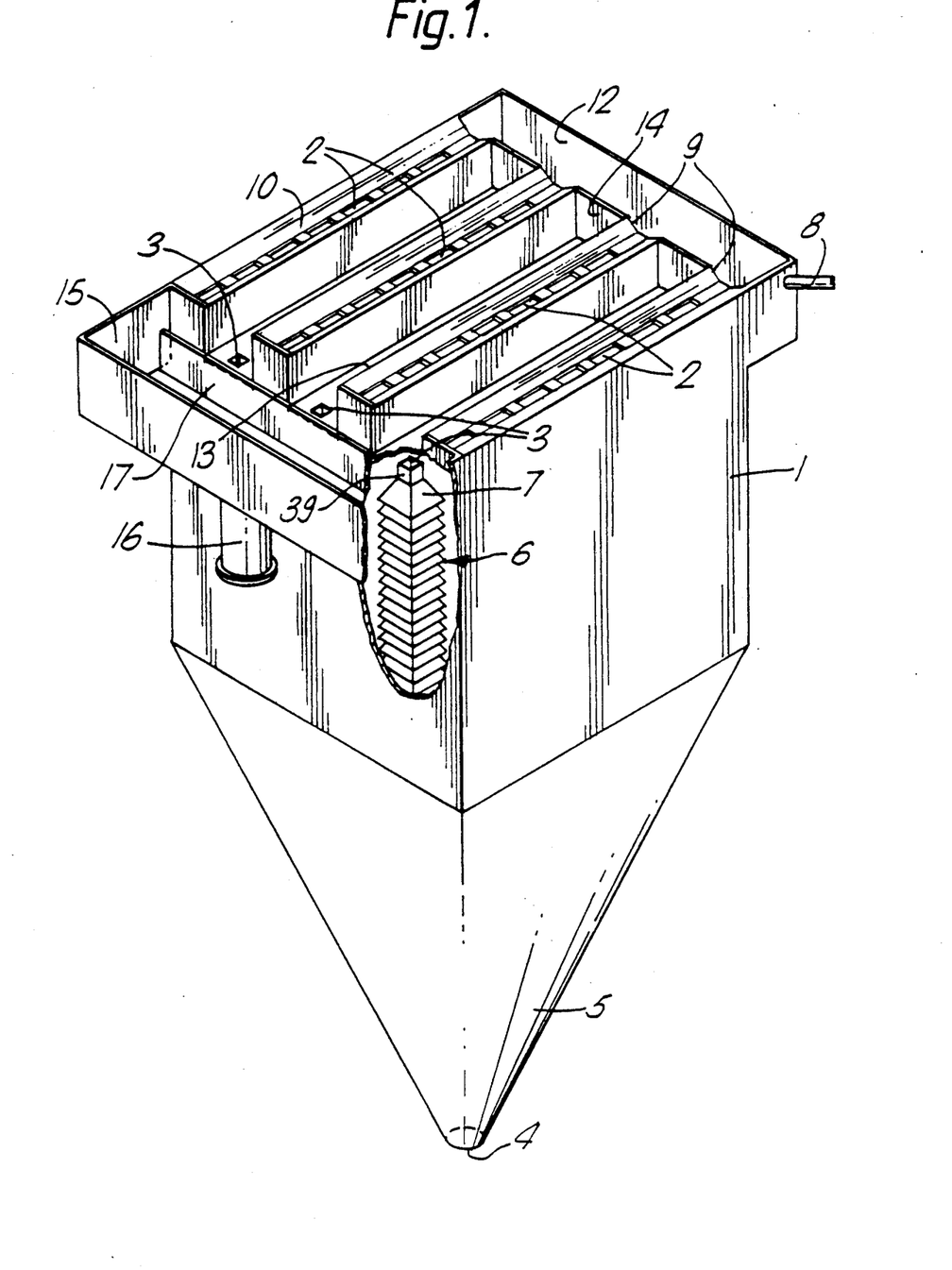
FIG. 1 shows a perspective view, part broken away, of an apparatus according to the invention.

The apparatus comprises a tank 1, inlets 2 for suspension to be clarified, outlets 3 for clarified water and outlet 4 for sedimented solids from a sedimentation conical zone 5 positioned beneath the rectangular tank 1. Within the tank 1 there are a plurality of stacks 6 of pyramids 7 mounted around a central composite duct 39. Each stack is positioned such that clarified liquid flowing up through the duct through the center of the stack emerges through the corresponding outlet 3.

The inlets 2 are elongate slots in the bases of troughs 9 in upper raised surfaces 10 of the tank. The troughs 9 open into a launder 12 and suspension to be clarified is pumped into this launder through pipe 8. It overflows from this launder along the troughs 9 and down through the inlets 2, into the chamber.

Liquid that has been clarified and is passing up through the stack 6 emerges from the outlets 3 in launders 13 between the raised parts 10 and that are blanked off at 14 but that open into a launder 15 provided with an outlet pipe 16. A vertically adjustable weir 17 is positioned at the ends of the launders 13 so as to control the depth of clarified liquid held in the launders Generally the weir 17 is adjusted to be, for instance, 0.5 to 5 cm above the base of the launder 13 so as to hold clarified water to this depth in the launder, as this helps maintain uniform flow of clarified water up through the stacks 6.

Figure 4A:
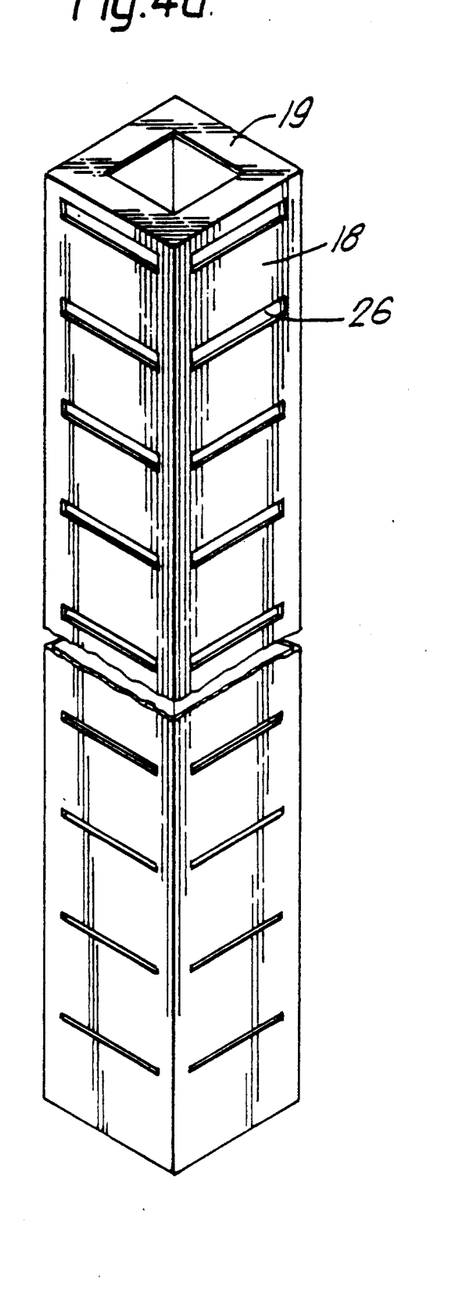
FIGS. 4a and 4b show, in exploded view, a composite collection duct of the type used in FIG. 1.
Figure 4B:
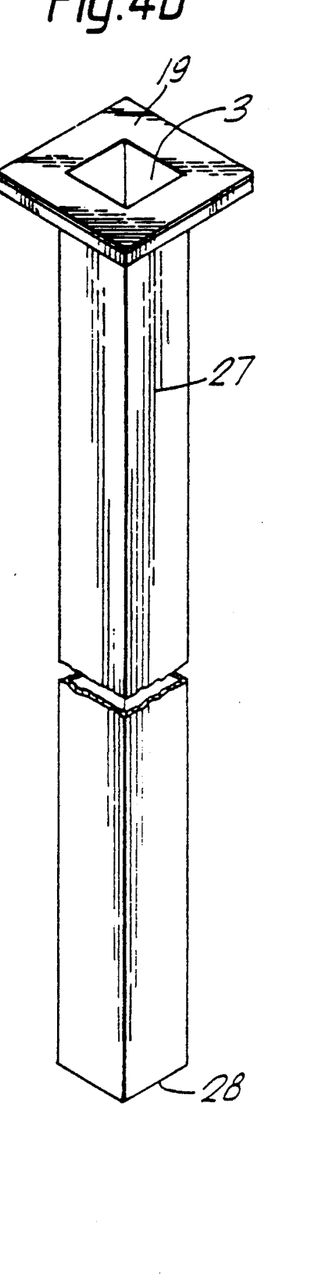

Each stack 6 consists of a plurality of setting plates 7. As shown in the drawings, these plates have the shape of pyramids but they could be, for instance, cones. Each pyramid may consist solely of outwardly inclined surfaces in which event each is preferably a tight sliding fit over a composite duct 39 that can be a downwardly extending duct 18 that is closed at the end 19, as shown in FIG. 4. However the pyramids or cones can have vertically extending necks 20 at their uppermost edges and these necks can slide over the duct 18 or they can inter-engage with each other so as to define the duct 18. The inter-engagement may be by means of, for instance, ribs 21 that clip over one another to hold the pyramids rigidly with respect to one another.

Figure 2:
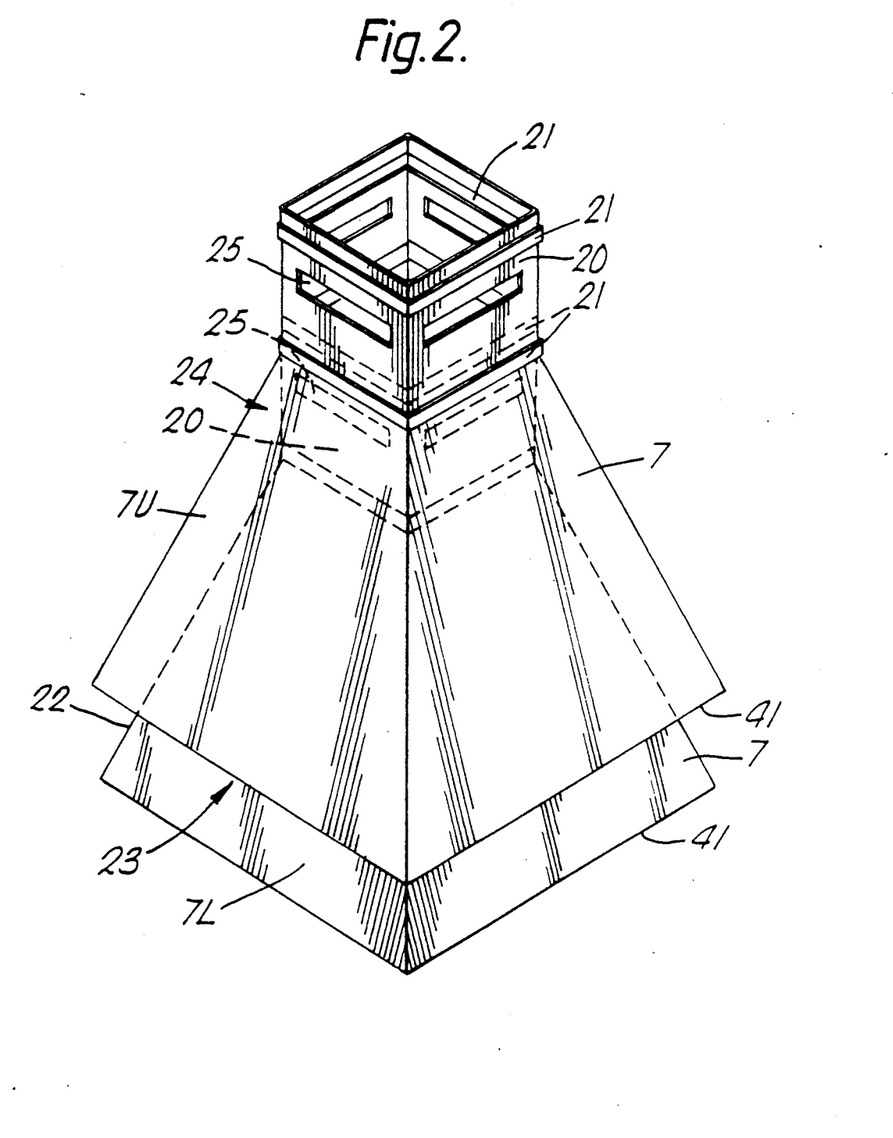
FIG. 2 shows, in enlarged perspective, part of a stack of pyramids of the type shown in FIG. 1.

Suspension flows down through the tank between the adjacent stacks and enters at the slot 22 between the lowermost edges of the lower part 23 of an adjacent pair of plates. The suspension flows upwardly between the inclined plates towards the upper part 24 and as it flows up between the plates solids tend to sediment on to the lower plate 7L while clarified liquor tends to rise up against the upper plate 7U. The cell between these plates is closed at its upper part 24 by a neck 20 or the pipe 18 but orifices 25 are provided in this upper part to allow the clarified water to escape from the cell into the central duct defined by the neck 20 or the pipe 18.

Figure 3:
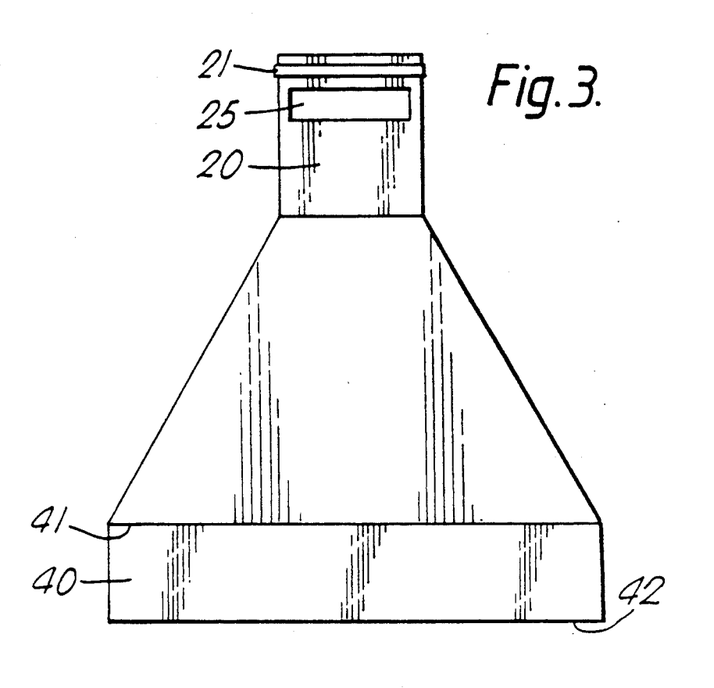
FIG. 3 shows a modified forms of pyramid.

FIG. 3 shows a pyramidal duct of the same general construction as the ducts illustrated in FIG. 2 except that a skirt 40 extends vertically downwards from the lowermost edge 41 of each of the pyramids The vertical spacing between adjacent pyramids is defined by the vertical height of the neck 20 and the skirt 40 has a vertical dimension less than about ¾ of the vertical spacing between the pyramids so as to ensure that the slot 23 that is defined between the lowermost edge 42 of the skirt and the lowermost edge of the next adjacent pyramid is at least about ¼ of the vertical spacing between the pyramids If the slot is too narrow then excessive mixing of the solids and the incoming suspension may occur. Preferably the vertical dimension of the skirt 40 is about half the vertical length of the neck 20.

The top of the outer duct 18, or the duct defined by the necks 20 of the pyramids, is blanked off (for instance as at 19 in FIG. 5) so that the flow through this duct has to be downwardly. If the duct is defined by pipe 18 then this is provided with orifices 26 in positions to match those of orifices 25.

The area of the orifices can decrease downwardly, for instance the orifices at the top of FIG. 4a are very much larger than the orifices at the bottom.

Figure 5:
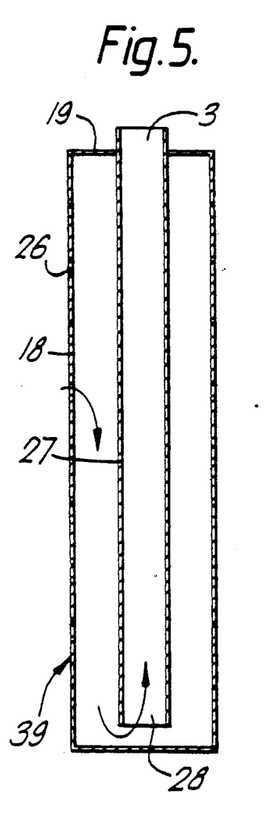
FIG. 5 shows, in diagrammatic vertical cross-section, the assembled composite collection duct of FIGS. 4a and 4b.

As shown in FIG. 5, the composite duct 39 is formed of a downflow collection pipe 18 or the vertical necks 20 and a co-axial, smaller, upflow duct 27 fitted in it. This duct is open at its lower end 28 so that the clarified water that flows downwardly along the annulus around duct 27 reverses its flow at the bottom 28 and flows upwardly through the duct 27 to the outlet 3, which is surrounded by a plate 19 that blanks off the top of the outer duct 18.

As shown in FIG. 2 to 4, the orifices are elongated slots extending over at least three quarters of the horizontal length of the plates at the position of the orfices, i.e. at top part 24, thus promoting uniformity of flow.

Figure 6:
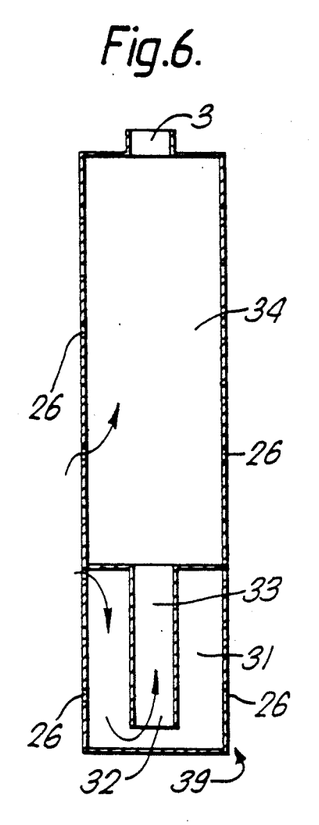
FIGS. 6 and 7 are sections similar to FIG. 5 but of different composite collection ducts.

In FIG. 6, the composite duct 39 comprises a short downflow duct 31, leading at 32 into an inner coaxial upflow duct that has a narrow portion 33 and that leads into an upflow collection portion 34.

Figure 7:
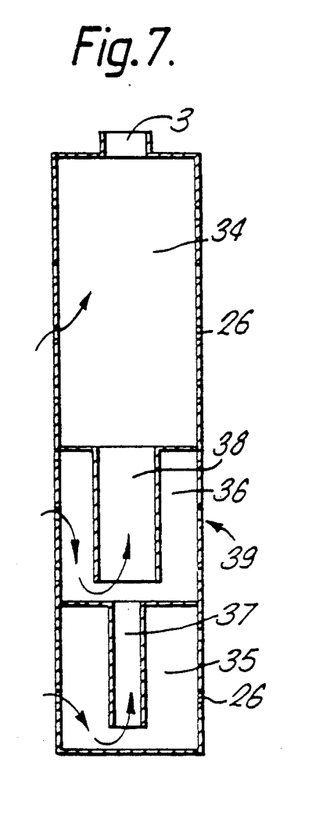

In FIG. 7, the composite duct 39 has two short downflow ducts 35 and 36. The upflow duct consists of a narrow portion 37 leading into a wider portion 38 leading into a collection portion 34 This provides a particularly convenient way of obtaining different flow rates through different orifices even though the orifices are all of the same dimensions. Also, replacement of downflow ducts 31, or 35 and 36, by different ducts having different lengths or radii permits further variation in flow rates. Three or more short downflow ducts may be used if required.

To install apparatus according to the invention it is preferred to provide in the desired place of use (for instance in a mine) the tank 1 provided with the necessary inlets and outlets 2 to 5, and subsequently to install in the tank a plurality of settling assemblies, each consisting of a stack 6 of the settling plates mounted around a vertical collection duct. The vertical collection duct may be fitted previously in the chamber, in which event the plates are merely fitted over it, but it is often preferred that an assembly comprising part or all of the vertical collection duct and the stack should be preassembled and inserted into the chamber.

In each of the examples the clarification-apparatus used was substantially as shown in FIG. 1, comprising a vertical rectangular tank having a height 2.13 meters and cross sectional area 0.21 m² with a sedimentation conical zone positioned beneath the rectangular tank for collection and removal of settled solids. Feed and overflow launders were also fitted at the top of the tank and stacks of pyramids were arranged inside the tank.

The central duct formed by each stack of pyramids had square cross sectional area, with the sides of the square base of the pyramids having length 15 cm. The slope of the pyramids was 53° to the horizontal. The central collection duct was provided with slots, through which clarified water could escape.

EXAMPLE 1

Four stacks of pyramids each comprising 30 pyramids spaced 2.5 cm apart, were arranged in the tank, in two pairs, each pair discharging into one of two launders.

Two of the stacks were according to the prior art and were operated with the central duct being a simple, single pipe so that clarified liquid could flow through the slots and into the duct and escaped upwards out of the apparatus (up flow only).

The remaining two stacks were operated in accordance with the invention (FIG. 6) with the top 50% of the pyramids delivering clarified liquids upwards, in the same way but with the bottom 50% of the pyramids delivering clarified water into the central duct consisting of a downwardly extending duct placed inside and coaxial with the upwardly extending collection duct so that clarified liquid flowed into the central duct and downwards through an outer sleeve, between the two ducts and then into the inner downwardly extending duct to flow upwards out of the apparatus, i.e., the initial removal of clarified water was downflow followed by upflow out of the apparatus, according to the invention (bottom 50% initial downflow).

The apparatus was operated for a substantial period of time with a feed rate of 15 m/hour (i.e., the volume of suspension for clarification entering the tank measured in m³ per hour per m² of tank area).

The suspension used for clarification was an aqueous solution of china clay particles with a solids content 580 mg per liter.

The rate of delivery of clarified water from both pairs of stacks was about 15 m/hour and the solids content of the clarified water was found to be 35 mg per liter for both pairs of stacks.

It was found that over the period of operation solid particles accumulated at the base of the upflow only stacks, to a level of about 8 cm whilst the stacks according to the invention in which the bottom 50% of pyramids delivered into a downflow collection duct did not accumulate any significant amount of solids.

EXAMPLE 2

Two stacks of pyramids having downflow collection of clarified water, according to the invention, each comprising 30 pyramids spaced 2.5 cm apart, were arranged in the tank. Aqueous suspension of china clay particles, having a solids content of 490 mg per liter was fed to the tank at a rate of 20 m per hour. The overflow of the clarified water was also at a rate of approximately 20 m per hour. The resultant clarified liquid contained a solids content of 51 mg per liter.

This process was repeated using pyramids having skirts as illustrated in FIG. 3. Due to the extra height of the skirts, only 15 pyramids could be arranged in a stack, with spacing of 5 cm (2 inches). In addition, the area of the orifices, per pyramid was twice the area for the apparatus having 30 pyramids, in order to provide a total equal area of the orifices per stack. The same aqueous china clay suspension having solids content of 490 mg per liter was supplied to the clarification apparatus at a rate of 20 m per hour, again the overflow rate of clarified liquid was approximately 20 m per hour. The solids content of the clarified liquid was even more significantly reduced to 31 mg per liter. Thus, even though the number of pyramids (i.e. the settlement area) was reduced, an even more efficient clarification was achieved.

In each of these examples the plant was operated at a flow rate for the suspension approximately 4 or 5 times a suitable flow rate in the absence of a stack, thus illustrating the benefit of the inclusion of the stack. In other processes the flow rates can be up to 10 or more times a suitable flow rate for an apparats in which there are no stacks.

I claim:
1. Liquor clarifying apparatus comprising:
    a tank having a top;
    at least one inlet into the tank;
    at least one launder in the top of the tank and from which liquid can be discharged;
    a plurality of first outlets for clarified liquor and that open into the at least one launder;
    at least one second outlet from the base of the tank for separated solids, and
    a plurality of settling assemblies
    wherein each settling assembly comprises
    a substantially vertical collection duct that leads up into one of the said first outlets for discharging clarified liquor into one said launder a stack of substantially pyramidal settling plates each of which comprises a neck portion and a downwardly inclined pyramidal portion, each adjacent pair of pyramidal plates being spaced apart by spacing means consisting essentially of a substantially vertical neck to define a pyramidal cell that leads from the neck downwardly through an inclined length of 5 to 30 cm to a parallel sided outlet slot that extends around the pyramidal cell and that has a vertical depth of at least 1 cm, and in which each neck has a length of 1–10 cm and is either a separate spacer neck or is integral with one of the said pyramidal plates, the collection duct either comprises the said integral necks or pipe over which the necks are slidably fitted, and there are orifices extending from each cell through each neck and into the duct for passage of clarified liquor from each cell into the duct and up into the launder.

2. Apparatus according to claim 1 in which the necks are integral, the collection duct is defined by the said integral necks and the necks are provided with interengaging fit means for securing the plates one above the other by push interengagement of the fit means.

3. Apparatus according to claim 1 in which the collection duct comprises an outer, downwardly extending, duct that is either defined by the said integral necks or is a pipe over which the necks are slidably fitted, and an inner substantially co-axial upwardly extending duct is so arranged within the downwardly extending duct that clarified liquor that enters the orifices extending into said downwardly extending duct first flows down the the downwardly extending duct and then flows up the upwardly extending duct to one of the said first outlets.

4. Apparatus according to claim 3 in which the downwardly extending duct collects from at least the lowermost 25% of the plates and the upwardly extending duct has orifices extending through the wall of the upwardly extending duct above the downwardly extending duct and collects from uppermost plates in the stack.

5. Apparatus according to claim 3 in which the upwardly extending duct extends along substantially the entire length of the downwardly extending duct.

6. Apparatus according to claim 1 including means for keeping the stack under axial compression.

7. Apparatus according to claim 1 in which the plates are formed of a plastics material having density below 1.

8. Apparatus according to claim 1 in which the orifices have a horizontal length greater than half the horizontal length of the uppermost edges of the plates at the neck portion.

9. Apparatus according to claim 1 in which the pair of adjacent settling plates defines a downwardly inclined substantially parallel-sided cell having an open slot defined b the lowermost edges of the pair.

10. Apparatus according to claim 1 in which each plate has a skirt extending downwardly from its lowermost edge to define a slot with the lowermost edge of the adjacent lower plate, the vertical dimension of the slot being less than ¾ of the vertical distance between the plates in the cell.

11. Apparatus according to claim 1 in which there are at least 30 of the said plates in each said stack having a vertical separation of 1 to 5 cm.

12. Apparatus according to claim 1 in which there are at least 30 of the said plates in each stack, with a gap of 2 to 10 cm between each pair of plates, and in which the said inclined length of each pyramidal cell is from 5 to 20 cm and the said cell and the said parallel sided outlet slots each have a vertical depth of from 1 to 5 cm.

13. A settling assembly constructed and arranged to be fitted within a liquid clarifying apparatus comprising a tank having a top, a first inlet into the tank, at least one launder in the top of the tank from which liquid can be discharged, a plurality of first outlets for clarifying liquor and that open into the at least one launder, and at least one second outlet from the base of the tank for separated solids, wherein the settling assembly comprises a substantially vertical collection duct that can lead up into one of the said first outlets for discharging clarified liquor into one said launder a stack of substantially pyramidal settling plates each of which comprises a neck portion and a downwardly inclined pyramidal portion, each adjacent pair of pyramidal plates being spaced apart by spacing means consisting essentially of a substantially vertical neck to define a pyramidal cell that leads from the neck downwardly through an inclined length of 5 to 30 cm to a parallel sided outlet slot that extends around the pyramidal cell and that has a vertical depth of at least 1 cm, and in which each neck has a length of 1–10 cm and is either a separate spacer neck or that is integral with one of the said pyramidal plates, the collection duct either comprises the said integral necks or a pipe over which the necks are slidably fitted, and there are orifices extending from each cell through each neck and into the duct for passage of clarified liquor from each cell into the duct and up into the launder.

14. An assembly according to claim 13 in which the necks are integral, the collection duct is defined by the said integral necks and the necks are provided with interengaging fit means for securing the plates one above the other by push interengagement of the fit means.

15. An assembly according to claim 13 in which the collection duct comprises an outer, downwardly extending, duct that is either defined by the said integral necks or is a pipe over which the necks are slidably fitted, and an inner substantially co-axial upwardly extending duct is so arranged within the downwardly extending duct that clarified liquor that enters the orifices extending into said downwardly extending duct first flows down the the downwardly extending duct and then flows up the upwardly extending duct to one of the said first outlets.

16. An assembly according to claim 15 in which the downwardly extending duct collects from at least the lowermost 25% of the plates and the upwardly extending duct has orifices extending through the wall of the upwardly extending duct above the downwardly extending duct and collects from uppermost plates in the stack.

17. An assembly according to claim 15 in which the upwardly extending duct extends along substantially the entire length of the downwardly extending duct.

18. An assembly according to claim 13 including means for keeping the slack under axial compression.

19. An assembly according to claim 13 in which the plates are formed of a plastics material having density below 1.

20. An assembly according to claim 13 in which the orifices have a horizontal length greater than half the horizontal length of the uppermost edges of the plates at the neck portion.

21. An assembly according to claim 13 in which the pair of adjacent settling plates defies a downwardly inclined substantially parallel-sided cell having an open slot defined b the lowermost edges of the pair.

22. An assembly according to claim 13 in which each plate has a skirt extending downwardly from its lowermost edge to define a slot with the lowermost edge of the adjacent lower plate, the vertical dimension of the slot being less than $\frac{3}{4}$ of the vertical distance between the plates in the cell.

23. An assembly according to claim 13 in which there are at least 30 of the said plates in said stack having a vertical separation of 1 to 5 cm.

24. An assembly according to claim 13 in which there are at least 30 of the said plates in said stack and in which the said inclined length of each pyramidal cell is from 5 to 20 cm and the said cell and the said parallel sided outlet slots each have a vertical depth of 1 to 5 cm.

* * * * *